(12) United States Patent
Tsugane (10) Patent No.: US 7,459,230 B2
(45) Date of Patent: Dec. 2, 2008

(54) MEMBRANE ELECTRODE ASSEMBLY FOR FUEL CELL

(75) Inventor: Takahide Tsugane, Toyoake (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 508 days.

(21) Appl. No.: 11/038,251

(22) Filed: Jan. 21, 2005

(65) Prior Publication Data
US 2005/0181263 A1    Aug. 18, 2005

(30) Foreign Application Priority Data
Jan. 22, 2004  (JP) ............... 2004-014844
Dec. 3, 2004   (JP) ............... 2004-351253

(51) Int. Cl.
H01M 2/08  (2006.01)
H01M 4/94  (2006.01)
H01M 8/10  (2006.01)

(52) U.S. Cl. ............... 429/36; 429/44; 429/30; 29/623.2

(58) Field of Classification Search ............ 429/36, 429/44, 30
See application file for complete search history.

(56) References Cited
U.S. PATENT DOCUMENTS
7,201,987 B2 *  4/2007  Sugita et al. ............ 429/35

2005/0173061 A1  8/2005  Xie
2005/0181263 A1  8/2005  Tsugane

FOREIGN PATENT DOCUMENTS
JP    6-338335    12/1994
JP    2003-234106  8/2003

* cited by examiner

Primary Examiner—Patrick Ryan
Assistant Examiner—Angela Martin
(74) Attorney, Agent, or Firm—Oblon, Spivak, McClelland, Maier & Neustadt, P.C.

(57) ABSTRACT

A membrane electrode assembly for a fuel cell includes an electrolyte membrane having ionic conductivity and a pair of gas diffusion electrodes having gas diffusivity and electric conductivity. Each of the pair of gas diffusion electrodes is bonded to one side or the other of the electrolyte membrane in a thickness direction. A bonding force for bonding at least one part of an outer circumferential area of the gas diffusion electrodes to the electrolyte membrane is set to at an inferior level to that of the bonding force for bonding a central area of the gas diffusion electrodes to the electrolyte membrane, so that an area of the electrolyte membrane facing the at least one part of the outer circumferential area of the gas diffusion electrodes can be protected from damage.

7 Claims, 8 Drawing Sheets

MEMBRANE ELECTRODE ASSEMBLY FOR FUEL CELL

CROSS REFERENCE TO RELATED APPLICATIONS

This application is based on and claims priority under 35 U.S.C. § 119 to Japanese Patent Application 2004-14844, filed on Jan. 22, 2004 and Japanese Patent Application 2004-351253, filed on Dec. 3, 2004, the entire content of which is incorporated herein by reference.

FIELD OF THE INVENTION

This invention generally relates to a fuel cell. More specifically, this invention relates to a membrane electrode assembly for a fuel cell.

BACKGROUND

Conventionally, a membrane electrode assembly (hereinafter referred to as an MEA) for a fuel cell has an electrolyte membrane having ionic conductivity and a pair of gas diffusion electrodes having gas diffusivity and electric conductivity bonded to both sides in thickness direction of the electrolyte membrane. When electricity is being generated, fuel is supplied to one of the gas diffusion electrodes, and oxidant is supplied to the other of the gas diffusion electrodes.

JP2003-234106A describes a technique for pressing, by means of a pressing machine, each of the gas diffusion electrodes before it is bonded to an electrolyte membrane. JP2003-234106A further describes that by the use of this technique surfaces of each of the gas diffusion electrodes are protected from flix by the use of this technique.

JP06(1994)-338335A describes a fuel cell including a membrane electrode assembly having an electrolyte membrane and gas diffusion electrodes bonded to both sides of the electrolyte membrane in a thickness direction. According to this fuel cell, curves are provided at corners of the tetragonal gas diffusion electrodes in plane view of the gas diffusion electrodes. JP1994-338335A further describes that even when an electrolyte membrane is caused to shrink, the electrolyte membrane is protected from damage.

As described above, the MEA has the electrolyte membrane having ionic conductivity and the pair of gas diffusion electrodes having gas diffusivity and electric conductivity bonded to both sides of the electrolyte membrane in a thickness direction thereof. For the MEA described above, a further improvement in quality of the fuel cell is required, further improvements in durability and longevity of the electrolyte membrane are accordingly required.

A need thus exists for a membrane electrode assembly for a fuel cell with further improved durability and further improved longevity of the electrolyte membrane, and a fuel cell. The present invention has been made in view of the above circumstances, and provides such an electrolyte membrane assembly for a fuel cell, and a fuel cell.

SUMMARY OF THE INVENTION

According to an aspect of the present invention, a membrane electrode assembly for a fuel cell includes an electrolyte membrane having ionic conductivity and a pair of gas diffusion electrodes having gas diffusivity and electric conductivity. Each of the pair of gas diffusion electrodes is bonded to one side or the other of the electrolyte membrane in a thickness direction. A bonding force for bonding at least one part of an outer circumferential area of the gas diffusion electrodes to the electrolyte membrane is set to at an inferior level to that of the bonding force for bonding a central area of the gas diffusion electrodes to the electrolyte membrane, so that an area of the electrolyte membrane facing the at least one part of the outer circumferential area of the gas diffusion electrodes can be protected from damage.

According to another aspect of the present invention, a membrane electrode assembly for a fuel cell is manufactured by the steps of a preparing step for preparing an electrolyte membrane having ionic conductivity and gas diffusion electrodes having gas diffusivity and electric conductivity, a stack making step for making up a stack from a pair of the gas diffusion electrodes and the electrolyte membrane positioned between the gas diffusion electrodes, and a pressing step for pressing the stack in a thickness direction by means of a pressing member, in such a manner that a level of pressing pressure for pressing at least one part of an outer circumferential area of each of the gas diffusion electrodes is either inferior to the pressing pressure for pressing a central area of the each of the gas diffusion electrodes, or is zero.

According to another aspect of the present invention, a membrane electrode assembly for a fuel cell is manufactured by steps of a preparing step for preparing an electrolyte membrane having ionic conductivity and gas diffusion layers having gas diffusivity and electric conductivity, a stack making step for making a stack from a pair of the gas diffusion layers, and the electrolyte membrane positioned between the pair of the gas diffusion layers, and catalyst layers respectively positioned between the each of the gas diffusion layers and the electrolyte membrane, and a pressing step for pressing the stack in a thickness direction by means of a pressing member, in such a manner that a level of pressing pressure for pressing at least one part of an outer circumferential area of the each of the gas diffusion layers is either inferior to the pressing pressure for pressing a central area of the each of the gas diffusion electrodes, or is zero.

According to another aspect of the present invention, a membrane electrode assembly for a fuel cell is manufactured by the steps of a preparing step for preparing an electrolyte membrane having ionic conductivity and gas diffusion electrodes having gas diffusivity and electric conductivity, a preliminary pressing step for preliminarily pressing the gas diffusion electrodes in a thickness direction, in such a manner that a level of pressing pressure for pressing at least one part of an outer circumferential area of each of the gas diffusion electrodes is superior to the pressing pressure for pressing a center area of each of the gas diffusion electrodes, a stack making step for making a stack from a pair of the gas diffusion electrodes and the electrolyte membrane positioned between the pair of the gas diffusion electrodes, and a pressing step for pressing the stack in a thickness direction by means of a pressing member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 2:
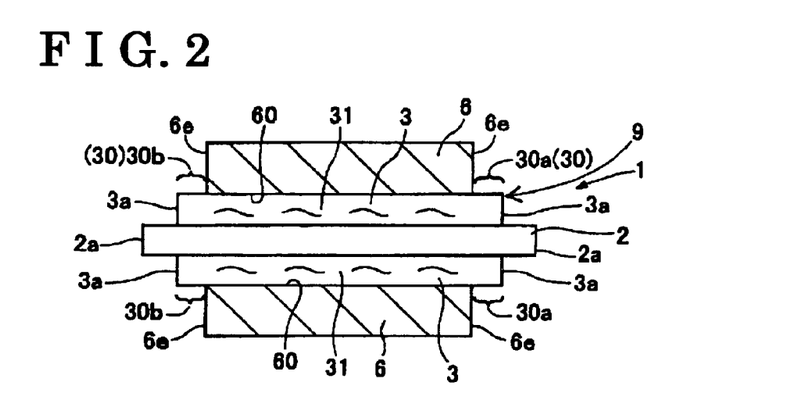
FIG. 2 shows a cross-sectional view taken on line II-II of FIG. 1 illustrating the pressing condition of the stack made of pair of the gas diffusion electrodes and the electrolyte membrane pressed by the pressing plates according to the first embodiment.
Figure 3:
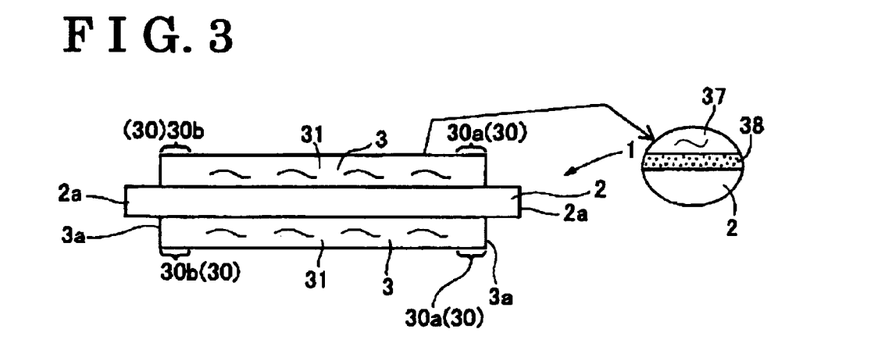
FIG. 3 shows a cross-sectional view illustrating a membrane electrode assembly (MEA) including the pair of the gas diffusion electrodes and the electrolyte membrane bonded to the gas diffusion electrodes according to the first embodiment.

A first embodiment of the present invention will be explained with reference to FIGS. 1-3. A membrane electrode assembly 1 (hereinafter referred to as an MEA) for a fuel cell includes an electrolyte membrane 2, which is of a sheet-shape and has ionic conductivity (proton conductivity), and a pair of gas diffusion electrodes 3 (gas diffusion layers), which are also of a sheet-shape and have both gas diffusivity and electric conductivity, each of the two gas diffusion electrodes 3 respectively bonded to either side of the electrolyte membrane 2 in a thickness direction. In the context of this specification, gas diffusion electrodes incorporates anything which has both gas diffusivity, an attribute whereby fuel and oxidants can permeate it, and also electric conductivity, and which also has a gas diffusion layer as a major element. In this case, the pair of the gas diffusion electrodes 3 is made of the same material, or of the same category of material. In other cases, one of the pair of gas diffusion electrodes can be made of a different material from the material with which the other of the pair of the gas diffusion electrodes 3 is made.

The electrolyte membrane is of a solid polymer type (such as a carbon fluoride and/or a hydrocarbon). The electrolyte membrane 2 is of a substantially tetragonal shape, and its surface area is greater than the surface area of each of the pair of the gas diffusion electrodes 3. The electrolyte membrane 2 has a pair of first edge portions 2a facing each other, and a pair of second edge portions 2b which are adjacent to the pair of first edge portions 2a and which face each other. In this context, the edge portion can either include, or not include, a corner area.

Each of the pair of gas diffusion electrodes 3 is of a substantially tetragonal shape. The surface area of each of the gas diffusion electrodes 3 is less than the surface area of the electrolyte membrane 2. Each of the gas diffusion electrodes 3 has a pair of first edge portions 3a facing each other and a pair of second edge portions 3b which are adjacent to the first edge portions 3a and which face each other. One of the pair of gas diffusion electrodes 3 is a fuel electrode to which fuel (such as hydrogen gas, or a hydrogen-containing gas) is supplied. The other of the pair of the gas diffusion electrodes 3 is an oxidant electrode to which oxidant (such as oxygen gas, or an oxygen-containing gas) is supplied.

The gas diffusion electrodes 3 described above have gas diffusivity and electric conductivity. The gas diffusion electrodes 3 have as a base material a porous medium made of a material having electric conductivity. In the embodiment, as shown in FIG. 3, each of the gas diffusion electrodes 3 includes a gas diffusion layer 37, which is a porous medium having gas diffusivity and electric conductivity, and a catalyst layer 38 positioned between the gas diffusion layer 37 and the electrolyte membrane 2, that is, boundary areas between the electrolyte membrane 2 and each of the gas diffusion electrodes 3. In a stack making step of the MEA1, the catalyst layer 38 can be initially placed on either the gas diffusion layer 37 or on the electrolyte membrane 2.

A projected area of the gas diffusion layer 37 and a projected area of the catalyst layer 38 are to all practical purposes identical. The projected area of the gas diffusion layer 37 means an area of the gas diffusion layer 37 projected in a perpendicular direction to the surface. The projected area of the catalyst layer means an area of the catalyst layer 38 projected in a perpendicular direction to the surface.

The gas diffusion layer 37, which is the major element of the each of the gas diffusion electrodes 3, has as a base material a porous material having electric conductivity (a fiber conductor such as a carbon fiber) so as to have gas permeability, meaning that fuel or oxidant can pass through it. The gas diffusion layer 37 of each of the gas diffusion electrodes 3 can have, as a base material, a carbon cloth, a carbon paper, or a sheet made from a carbon fiber which has been through a process similar to that used in the manufacture of paper, but is not limited to such a material. The catalyst layer 38 has a catalytic element as a base material a catalytic element such as platinum or rhodium and an electrolytic element.

An outer circumferential area 30 of each of the gas diffusion electrodes 3, (meaning the entire area, or one part thereof, along the outer circumference of each of the gas diffusion electrodes 3, including an edge area and a corner area of each of the gas diffusion electrodes 3) is of a frame-shape (a part marked X shown in FIG. 1), and includes circumferential areas 30a, 30b along the first edge portions 3a, and circumferential areas 30c, 30d along the second edge portions 3b. According to the embodiment, a bonding force for bonding the outer circumferential area 30 (circumferential areas 30a, 30b, 30c, 30d) of each of the gas diffusion electrodes 3 to the electrolyte membrane 2 is set to a level which is inferior (including both minor pressing pressure, and no pressing pressure at all) to that of the bonding force for bonding the central area 31 of each of the gas diffusion electrodes 3 to the electrolyte membrane 2. In this context, for at least one part of the outer circumferential area, "the bonding force is set at an inferior level" includes a case where the bonding force to the electrolyte membrane 2 is zero (no pressing pressure). As a result, in the electrolyte membrane 2, a membrane part facing the outer circumferential area 30 (the circumferential areas 30a, 30b, 30c, 30d) of each of the gas diffusion electrodes 3 can be protected from damage.

According to the embodiment, MEA1 is manufactured as follows. At first, the electrolyte membrane 2 and the pair of the gas diffusion electrodes 3 are prepared, both in a sheet-shape. Next, a stack 9 made up of a pair of gas diffusion electrodes 3 and an electrolyte membrane 2 positioned between the pair of the gas diffusion electrodes 3 is formed. In the stack 9, it is preferable that a catalyst paste (the catalyst layer 38), including as main elements a catalyst such as platinum, and an electrolyte, be provided at the boundary area between the gas diffusion layer 37, serving as the main element of the gas diffusion electrodes 3, and the electrolyte membrane 2. In this case, the catalyst layer 38 made of catalyst paste can be attached either to a surface of the electrolyte membrane 2 or to a surface of the gas diffusion layer 37. Accordingly, the catalyst layer 38 can be provided at the boundary area between the gas diffusion layer 37, which is the main element of each of the gas diffusion electrodes 3, and the electrolyte membrane 2.

In a pressing step, a pair of pressing plates 6 functioning as a pressing member is used. Each of the pressing plates 6 includes a pair of first edge portions 6e, facing each other, and a pair of second edge portions 6f which are adjacent to the pair of the first edge portions 6e and also face each other. Each of the pressing plates 6 includes a pressing surface 60, and the two pressing surfaces 60 face each other. Between the pressing surface 60 of each of the pressing plates 6, the stack 9 is placed. Each of the pressing plates 6 is heated to a predetermined temperature by an internal heat source or an external heat source. The temperature of each of the pressing plates can be set to between 80° C. and 200° C., but the temperature is not limited to such a range.

Next, by operating each of the pressing plates 6, and by narrowing a clearance between the pressing surface 60 of each of the pair of the pressing plates 6, the stack 9 is pressed in a thickness direction by the pressing surface 60 of each of the pair of the pressing plates 6 in a hot-press condition. By doing this, the gas diffusion electrodes 3 of the stack 9 are pressed in a thickness direction, each of the pair of gas diffusion electrodes 3, and the electrolyte membrane 2, are bonded, and an MEA 1 is structured.

Figure 1:
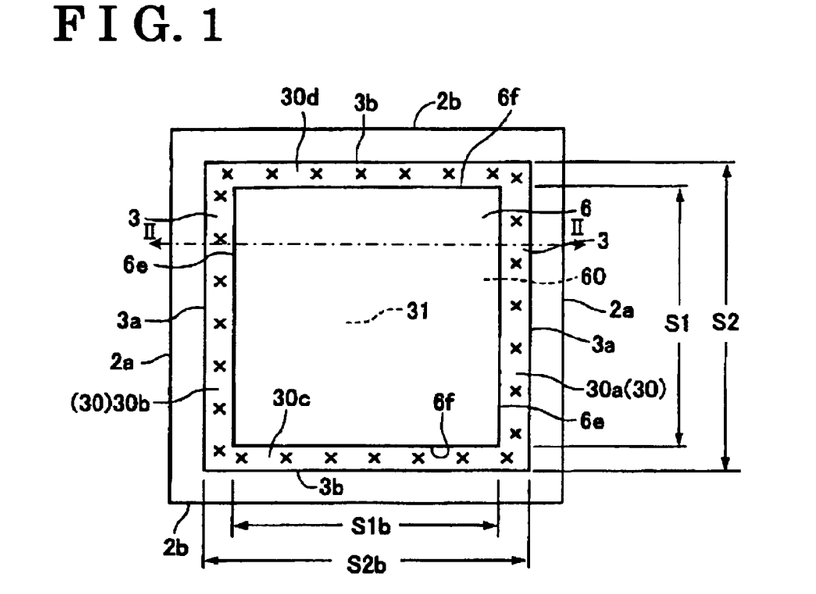
FIG. 1 shows a plane view illustrating a pressing condition of a stack made of gas diffusion electrodes and an electrolyte membrane pressed by pressing plates according to a first embodiment.

At this time, as shown in FIG. 1, a size S1 of each of the pressing plates 6 in a first direction is set to be smaller than a size S2 of each of the gas diffusion electrodes 3 in the same first direction. Similarly, a size S1b of each of the pressing plates 6 in a second direction is set to be smaller than a size S2b of each of the gas diffusion electrodes 3 in the same second direction. These relationships of magnitudes of sizes correspond to relationships of magnitude between projected areas. Accordingly, a projected area of the pressing surface 60 of each of the pressing plates 6 is less than the projected area of each of the gas diffusion electrodes 3.

According to the embodiment described above, in the pressing step described above, in the gas diffusion electrodes 3, a part facing the pressing surface 60 of each of the pressing plates 6 is efficiently pressed by the pressing surface 60 of each of the pressing plates 6. As a result, a bonding force between the central area 31 of each of the gas diffusion electrodes 3 and the electrolyte membrane 2 is intensified. Thus, ion conductivity between each of the gas diffusion electrodes 3 and the electrolyte membrane 2 can be satisfactorily ensured. Further, when plural MEAs 1 are aligned and assembled as a fuel cell with a gas distribution plate, each of the gas diffusion electrodes 3 and the electrolyte membrane 2 can be inhibited from being displaced, an advantage which contributes to an improvement in quality of the fuel cell.

On the other hand, as described above, the projected area of the pressing surface 60 of each of the pressing plates 6 is less than the projected area of each of the gas diffusion electrodes 3. Therefore, in each of the gas diffusion electrodes 3, a part larger than size S1 of the pressing surface 60 of each of the pressing plates 6 is not pressed by the pressing plates 6. In other words, this part is to all intents and purposes not pressed during the pressing step. Similarly, in each of the gas diffusion electrodes 3, a part larger than the size S1b of the pressing surface 60 of each of the pressing plates 6 is not pressed. In other words, this part is to all intents and purposes not pressed during the pressing step.

In other words, in the pressing step, in each of the gas diffusion electrodes 3, the degree of bonding force of the outer circumferential area 30 (circumferential areas 30a, 30b, 30c, 30d) to the electrolyte membrane 2 becomes inferior to that of the bonding force of the central area 31 of each of the gas diffusion electrodes 3 to the electrolyte membrane 2. In other words, this part is pressed to only a minor pressing degree, or not pressed at all.

Therefore, in the pressing step described above, the outer circumferential area 30 (circumferential areas 30a, 30b, 30c, 30d) of the gas diffusion layer 37, as the main element of each of the gas diffusion electrodes 3, can be prevented in advantage from becoming bonded excessively to the surface of the electrolyte membrane 2. Thus, when the pressing step described above is performed, or, even when the electrolyte membrane 2 is repeatedly expanded and contracted at the time that the MEA 1 is assembled, together with the gas distribution plate as the fuel cell, in the electrolyte membrane 2, a membrane part facing the outer circumferential area 30 (circumferential areas 30a, 30b, 30c, 30d) of the gas diffusion layer 37, serving as the main element of the each of the gas diffusion electrodes 3 is protected from damage, a merit which is advantageous in terms of a further improvement in the durability and longevity of the electrolyte membrane 2.

Figure 5:
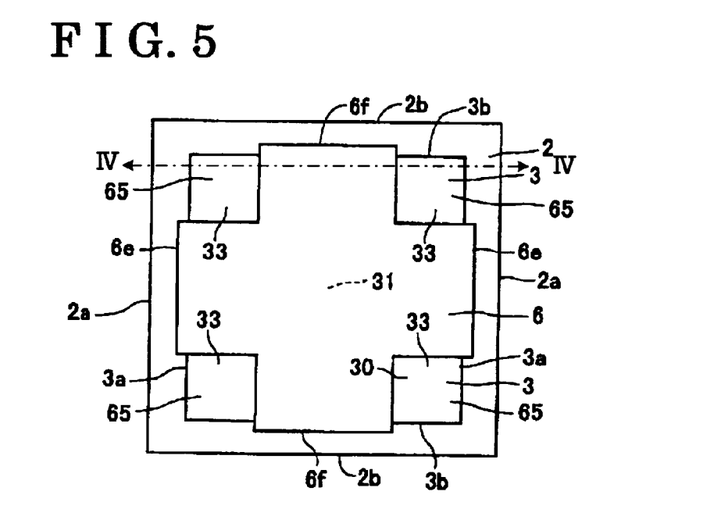
FIG. 5 shows a plane view illustrating a pressing condition of a stack made of a pair of gas diffusion electrodes and an electrolyte membrane pressed by the pressing plates according to the second embodiment.
Figure 6:
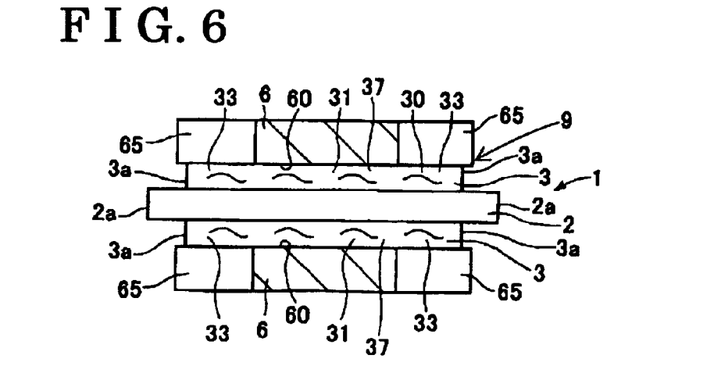
FIG. 6 shows a cross-sectional view taken on line VI-VI of FIG. 5 illustrating the pressing condition of the stack made of the pair of the gas diffusion electrodes and the electrolyte membrane pressed by the pressing plates according to the second embodiment.

A second embodiment of the present invention will be explained with reference to FIGS. 4-6. The second embodiment basically has a similar structure, operation and effect to those of the first embodiment. Parts common to the first embodiment are numbered in the same manner, and in the following part, emphasis will be placed on an explanation of differences from the first embodiment. As shown in FIG. 6, an MEA1 according to the second embodiment includes an electrolyte membrane 2, and a pair of gas diffusion electrodes 3 having gas diffusivity and electric conductivity, and bonded respectively either side of the electrolyte membrane 2 in a thickness direction.

According to the embodiment, the MEA 1 is manufactured in the following way. First, the electrolyte membrane 2 and the pair of the gas diffusion electrodes are prepared. Next, a stack 9 made of a pair of the gas diffusion electrodes 3 and an electrolyte membrane 2 positioned between the pair of the gas diffusion electrodes 3 is prepared. Each of the gas diffusion electrodes 3 includes a gas diffusion layer and a catalyst layer similar to above description. In a stack making step, the catalyst layer can initially be placed either on the surface of the gas diffusion layer or on the surface of the electrolyte membrane 2.

Next, as shown in FIG. 6, the stack 9 is placed between a pair of pressing plates 6 serving as a pressing member. Each of the pressing plates 6 has a flat pressing surface 60, and the flat pressing surfaces 60 face each other. Then, in a similar manner to the first embodiment, by narrowing a clearance between the pressing surface 60 of each of the pair of the pressing plates 6, the stack 9 is pressed in a thickness direction by the pressing surface 60 of each of the pressing plates 6 in a hot-press condition. In this manner, the stack 9 is pressed in a thickness direction, each of the gas diffusion electrodes 3 and the electrolyte membrane 2 are bonded, and an MEA 1 is thus structured.

Figure 4:
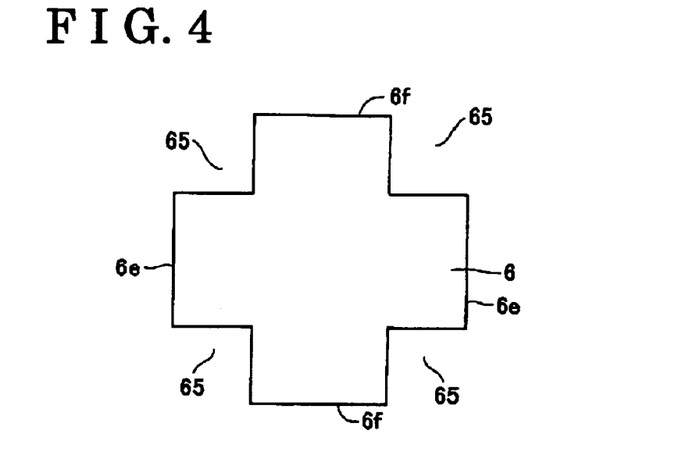
FIG. 4 shows a plane view illustrating each of pressing plates according to a second embodiment.

As shown in FIG. 4, in a plane view, a corner portion of each of the pressing plates 6 includes a space portion 65 that does not have a pressing surface. In this case, when the pressing step described above is performed, in each of the gas diffusion electrodes 3, a part facing the pressing surface 60 of each of the pressing plates 6 is efficiently pressed by the pressing surface 60 of each of the pressing plates 6. As a result, a bonding force between a central area 31 of each of the gas diffusion electrodes 3 and the electrolyte membrane 2 is intensified. Thus, ion conductivity between the central area 31 of each of the gas diffusion electrodes 3 and the electrolyte membrane 2 can be satisfactorily ensured. Further, when plural MEAs 1 are aligned and assembled together with a gas distribution plate as a fuel cell, each of the gas diffusion electrodes 3 and the electrolyte membrane 2 can be inhibited from being displaced, an advantage which contributes to an improvement in the quality of the fuel cell.

On the other hand, when the pressing step described above is performed, in each of the gas diffusion electrodes 3, a part facing the space portion 65 of the pressing plates 6 is not pressed. In other words, this part is to all intents and purposes not pressed during the pressing step. In general terms, within an outer circumferential area 30 of each of the gas diffusion electrodes 3, stress tends to concentrate particularly in the corner areas, a phenomenon which, in the electrolyte membrane 2, causes a membrane part facing the corner areas of the gas diffusion electrodes 3 to become easily damaged. However, in the embodiment, a level of bonding force of a corner area 33 of an outer circumferential area 30 of each of the gas diffusion electrodes 3 to the electrolyte membrane 2 becomes inferior to that of the bonding force of the central area 31 of each of the gas diffusion electrodes 3. In this case, if plural corner areas exist, although this can on occasions depend on the angle of the corner area, it is preferable that the bonding force of all or at least more than a half of the corner areas of each of the gas diffusion electrodes 3 to the electrolyte membrane 2, be set to at an inferior level to that of the bonding force of the central area 31 of each of the gas diffusion electrodes 3 to the electrolyte membrane 2. Thus, in the pressing step described above, the corner area 33 of the outer circumferential area 30 of each of the gas diffusion electrodes 3 can be inhibited in advance from becoming excessively bonded to the electrolyte membrane 2. Thus, when the pressing step is performed, or, even when the electrolyte membrane 2 is repeatedly expanded and contracted at the time that the MEA 1 is assembled , together with a gas distribution plate, as the fuel cell, in the electrolyte membrane 2, a membrane part facing the corner area 33 of the outer circumferential area 30 of the gas diffusion electrodes 3 is protected from damage, a merit which is advantageous in terms of a further improvement in the durability and longevity of the electrolyte membrane 2.

Figure 7:
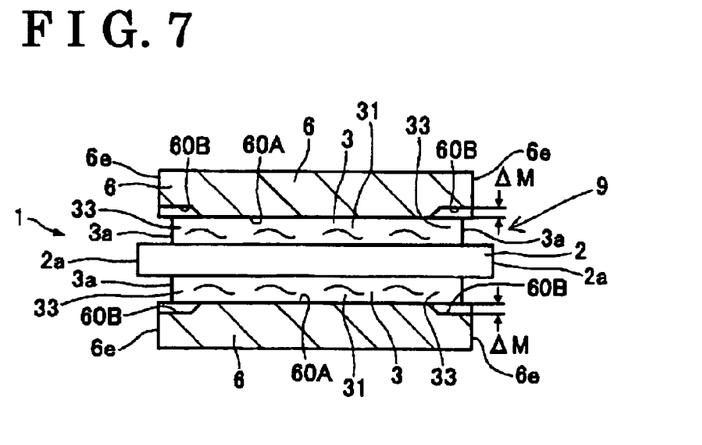
FIG. 7 shows a cross-sectional view illustrating a pressing condition of a stack made of a pair of gas diffusion electrodes and an electrolyte membrane pressed by pressing plates according to a third embodiment.
Figure 8:
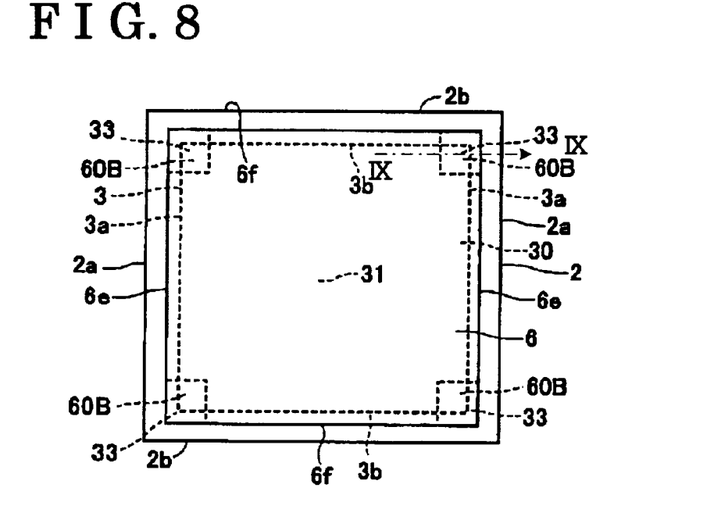
FIG. 8 shows a plane view illustrating the pressing condition of the stack made of the gas diffusion electrodes and the electrolyte membrane pressed by the pressing plates according to the third embodiment.
Figure 9:
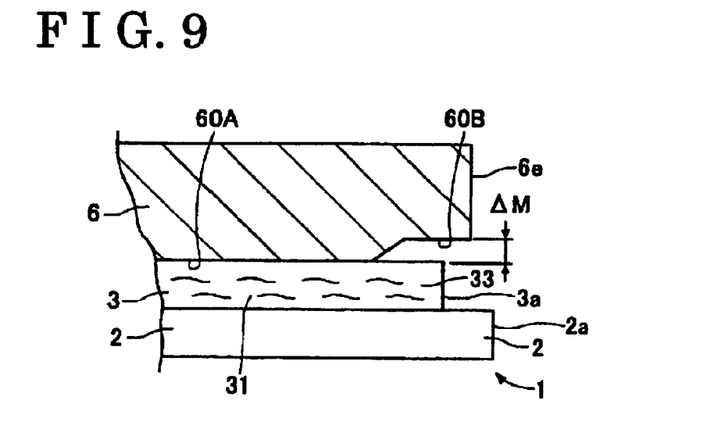
FIG. 9 shows an enlarged partial cross-sectional view taken on line IX-IX of FIG. 8 illustrating the pressing condition of the stack made of the gas diffusion electrodes and the electrolyte membrane pressed by the pressing plates according to the third embodiment.

A third embodiment of the present invention will be explained with reference to FIGS. 7-9. The third embodiment basically has a similar structure, operation and effect to those of the second embodiment. Parts common to the second embodiment are numbered in the same manner, and in following part, emphasis will be placed on an explanation of differences from the second embodiment. As shown in FIG. 7 and FIG. 9, each of the pressing plates 6 includes a main pressing surface 60A, for functioning as a main surface corresponding to a center of each of the pressing plates 6, and a sub-surface 60B corresponding to a corner portion of the pressing plates 6. For purposes of reducing pressing pressure, the sub-surface 60B is hollowed from the main pressing surface 60A by ΔM (as shown in FIG. 9).

Each of the gas diffusion electrodes 3 includes a gas diffusion layer and a catalyst layer similar to those described above. In a stack making step, the catalyst layer can be initially placed either on a surface of the gas diffusion layer or on a surface of the electrolyte membrane 2.

In a pressing step, in a similar manner to the first embodiment, the stack 9 is pressed by the main pressing surface 60A of each of the pressing plates 6. When this pressing step is performed, in each of the gas diffusion electrodes 3 of the stack 9, a part facing the main pressing surface 60A of each of the pressing plates 6 is efficiently pressed by the main pressing surface 60A of each of the pressing plates 6. As a result, in the stack 9, the degree of bonding force of the central area 31 of each of the gas diffusion electrodes 3 to the electrolyte membrane 2 is intensified.

On the other hand, when the pressing step described above is performed, in each of the gas diffusion electrodes 3 having gas diffusivity and electric conductivity, a level of pressing force applied to a part facing the sub-surface 60B of each of the pressing plates 6 becomes inferior to that of the pressing force applied by the main pressing surface 60A. The reason for this is that the sub-surface 60B is hollowed from the main pressing surface 60A by $\Delta M$, and the level of a pressing force applied by the sub-surface 60B of each of the pressing plates 6 accordingly becomes inferior to that of the pressing force applied by the main pressing surface 60A, or becomes zero. Therefore, when the pressing step described above is performed, the corner area 33 of the outer circumferential area 30 of each of the gas diffusion electrodes 3 is inhibited in advance from becoming bonded excessively to the electrolyte membrane 2. Accordingly, when the pressing step is performed, or, even when the electrolyte membrane 2 is repeatedly expanded and contracted at a time that the MEA 1 is assembled, together with the gas distribution plate, as the fuel cell, in the electrolyte membrane 2, a membrane part facing the outer circumferential area 30 of each of the gas diffusion electrodes 3 is protected from damage, a merit which is advantageous in terms of a further improvement in durability and longevity of the electrolyte membrane 2.

Figure 10:
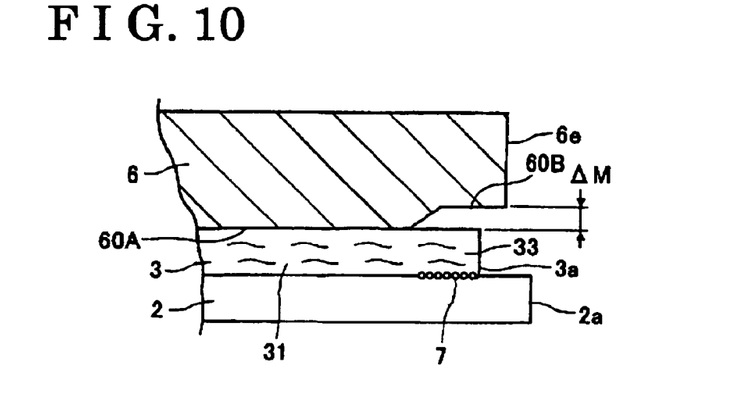
FIG. 10 shows an enlarged partial cross-sectional view illustrating a pressing condition of a stack made of gas diffusion electrodes and an electrolyte membrane pressed by pressing plates according to a fourth embodiment.

A fourth embodiment of the present invention will be explained with reference to FIG. 10. The fourth embodiment basically has a similar structure, operation and effect to those of the third embodiment. Parts common to the third embodiment are numbered in the same manner, and in following part, emphasis will be placed on an explanation of differences from the third embodiment. As shown in FIG. 8, each of pressing plates 6 includes a main pressing surface 60A corresponding to a center of each of the pressing plates 6 and a sub-surface 60B corresponding to a corner portion of each of the pressing plates 6. The sub-surface 60B is hollowed from the main pressing surface 60A by $\Delta M$.

Also in the embodiment, each of the gas diffusion electrodes 3 includes a gas diffusion layer and a catalyst layer. In a stack making step, the catalyst layer can be initially placed either on the gas diffusion layer or on the electrolyte membrane 2.

As described above, in each of the gas diffusion electrodes 3, a level of pressing force on a part facing the sub-surface 60B of the pressing plates 6 becomes inferior to that of the pressing force applied by the main pressing surface 60A. Therefore, the level of pressing force applied by the sub-surface 60B of each of the pressing plates 6 becomes inferior to that of the pressing force applied by the main pressing surface 60A.

In this case, although this can on occasions depend on conditions prevailing, there is a danger of an excessively low level of pressing influencing ionic conductivity in the boundary areas between the electrolyte membrane 2 and each of the gas diffusion electrodes 3. In other words, in a part on which the pressing force is zero, or minor, during the pressing step, a bonding property between the electrolyte membrane 2 and each of the gas diffusion electrodes 3 might become lower than that of another part, a difference which might lead to a situation where there is a danger of local degradation of ionic conductivity. Regarding this point, according to the embodiment, a supplemental element 7, including a polymer electrolyte membrane solution, as an electrolyte, can be disposed to a position facing at least one of the sub-surfaces 60B of the pressing plates 6, in other words, a part, between at least one of the gas diffusion electrodes 3 and the electrolyte membrane 2, on which pressing pressure has been inconsequential, or at a zero level. Therefore, even when the pressing force on the corner area 33 of each of the gas diffusion electrodes 3 is modest, and a bonding force thereof is thus minor, proton conductivity is enhanced by the supplemental element 7 disposed, a supplemental element 7 that includes the polymer electrolyte membrane solution. Generally speaking, the corner area 33 refers to an area at which borders of the circumferential area of each of the gas diffusion electrodes 3, or outlines thereof, cross. In this case, the pressing step is performed in a condition after the supplemental element 7 has been disposed.

Figure 11:
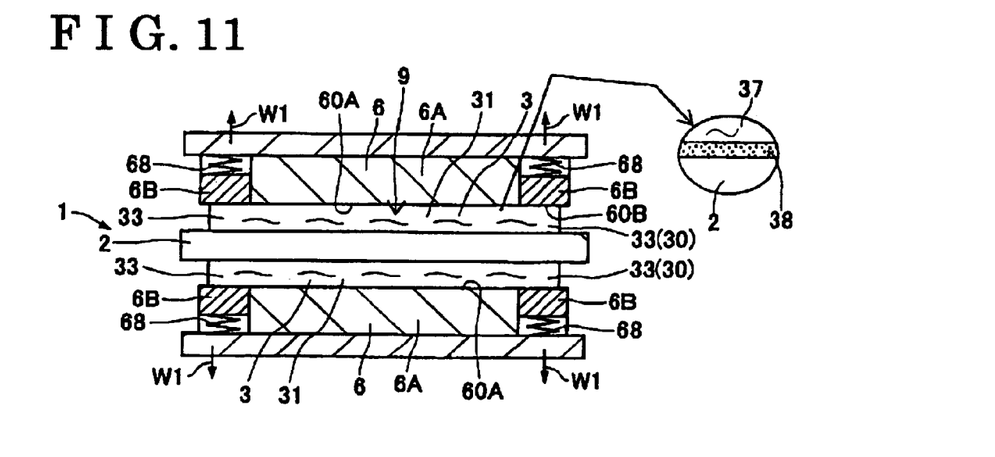
FIG. 11 shows a cross-sectional view illustrating a pressing condition of a stack made of a pair of gas diffusion electrodes and an electrolyte membrane pressed by pressing plates according to a fifth embodiment.

A fifth embodiment of the present invention will be explained with reference to FIG. 11. The fifth embodiment basically has a similar structure, operation and effect to those of the first embodiment. Parts common to the first embodiment are numbered in the same manner, and in following part, emphasis will be placed on an explanation of differences from the first embodiment. As shown in FIG. 11, each of pressing plates 6 includes a main pressing plate 6A corresponding to a center of each of the pressing plates 6 and a sub-pressing plate 6B, which is provided at a corner portion of the main pressing plate 6A. The main pressing plates 6A includes a main pressing surface 60A. The sub-pressing plate 6B includes the sub-surface 60B. The sub-pressing plate 6B is independent of the main pressing plate 6A. The sub-pressing plate 6B can be drawn back in a backward direction (indicated by arrow W1) by a biasing member 68, such as an elastically expandable and contractible spring. Also in the embodiment, each of the gas diffusion electrodes 3 includes a gas diffusion layer 37 and a catalyst layer 38. In a stack making step, the catalyst layer 38 can be initially placed either on the gas diffusion layer 37 or on the electrolyte membrane 2.

In the pressing step, the stack 9 is pressed by each of the pressing plates 6. When the pressing step is performed, in each of the gas diffusion electrodes 3, a part opposing the main pressing surface 60A of each of the main pressing plates 6A is efficiently pressed by the main pressing surface 60A of each of the main pressing plates 6A. As a result, in the same manner as in the first and second embodiments, a bonding force is intensified between a central area 31 of the gas diffusion layer 37, serving as a main element of each of the gas diffusion electrodes 3 and the electrolyte membrane 2.

On the other hand, when the pressing step described above is performed, in the gas diffusion layer 37, serving as the main element of each of the gas diffusion electrodes 3, a level of pressing force on a part facing the sub-surface 60B of the sub-pressing plates 6B becomes inferior to that of the pressing force applied by the main pressing surface 60A of the main pressing plates 6A. The reason for this is that the sub-surface 60B of each of the sub-pressing plates 6B can be drawn back from the main pressing surface 60A by the elastic contraction of the biasing member 68.

Therefore, a level of a pressing force on the sub-surface 60B of each of the pressing plates 6 becomes inferior to that of the pressing force on the main pressing surface 60A. Therefore, in the pressing step described above, the corner area 33 of the outer circumferential area 30 of each of the gas diffusion electrodes 3 is inhibited in advance from becoming excessively bonded to the electrolyte membrane 2. Thus, when the pressing step is performed, or, even when the electrolyte membrane 2 is repeatedly expanded and contracted at a time that the MEA 1 is assembled as the fuel cell, in the electrolyte membrane 2, a membrane part facing the corner area 33 of the outer circumferential area 30 of each of the gas diffusion electrodes 3 can be protected from damage, a merit which is advantageous in terms of a further improvement in durability and longevity of the electrolyte membrane 2. In this case, though this can on occasions depend on conditions prevailing, a supplemental element 7, including a polymer electrolyte membrane solution, can be disposed to a position facing the sub surface 60B of each of the sub-pressing plates 6B, between each of the gas diffusion electrodes 3 and the electrolyte membrane 2.

Figure 12:
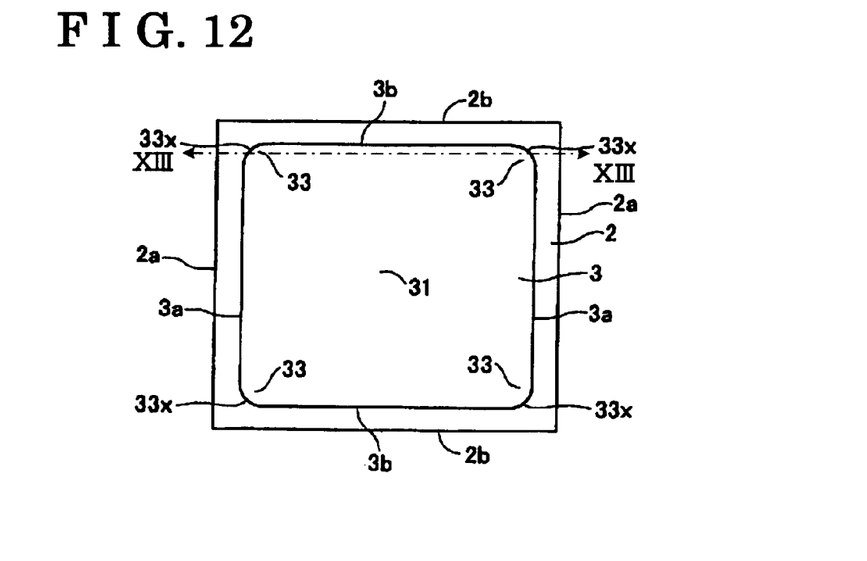
FIG. 12 shows a plane view illustrating a stack made of gas diffusion electrodes and an electrolyte membrane according to a sixth embodiment.

The sixth embodiment of the present invention will be explained with reference to FIG. 12 and FIG. 13. The sixth embodiment basically has a similar structure, operation and effect to that of the second embodiment. Parts common to the second embodiment are numbered in the same manner, and in the following part, emphasis will be placed on an explanation of differences from the second embodiment. As shown in FIG. 12, in a plane view, if during the pressing step described above, a corner area 33 of each of the gas diffusion electrodes 3 is an acute angle, stress tends to concentrate, and although this may depend on the type of material used for the electrolyte membrane 2, there is a danger of the electrolyte membrane 2 becoming damaged. In this case, a portion 33x of either a curved shape or an oblique shape is structured at the tip of the corner area 33 of each of the gas diffusion electrodes 3. In this way, stress applied by the corner area 33 is further reduced, a positive factor which raises expectations of a further improvement in durability of the electrolyte membrane 2.

Figure 13:
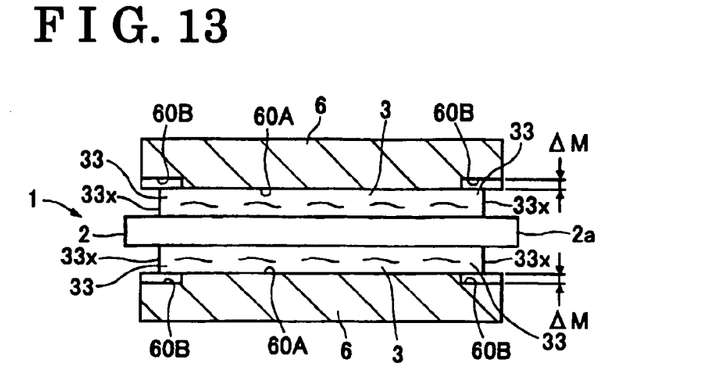
FIG. 13 shows a cross-sectional view taken on line XIII-XIII of FIG. 12 illustrating a pressing condition of the stack made of a pair of the gas diffusion electrodes and the electrolyte membrane pressed by pressing plates according to the sixth embodiment.

Further, as shown in FIG. 13, each of pressing plates 6 includes a main pressing surface 60A as a main surface corresponding to a center of each of the pressing plates 6 and a sub-surface 60B corresponding to a corner portion of each of the pressing plates 6. The sub-surface 60B can function as a sub-pressing surface. The sub-surface 60B is hollowed from the main pressing surface 60A by ΔM so that a pressing force is reduced to a level inferior to that of the pressing force of the main pressing surface 60A, or to a zero level. As described above, in each of the gas diffusion electrodes 3, a part facing the sub-surface 60B of each of the pressing plates 6 is pressed by a level of pressing force that is inferior to that of the pressing force applied by the main pressing surface 60A, or is not pressed at all. Accordingly, the levels of a pressing force, applied by the sub-surface 60B of each of the pressing plates 6, and of a bonding force generated by that pressing force, become inferior to those of the pressing force, applied by the main pressing surface 60A, and of the bonding force generated by that pressing force.

Figure 14:
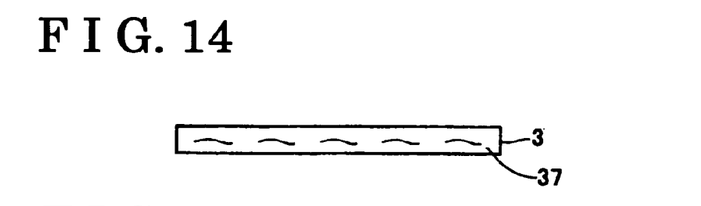
FIG. 14 shows a cross-sectional view illustrating each of the gas diffusion electrodes before being bonded to an electrolyte membrane according to a seventh embodiment.
Figure 15:
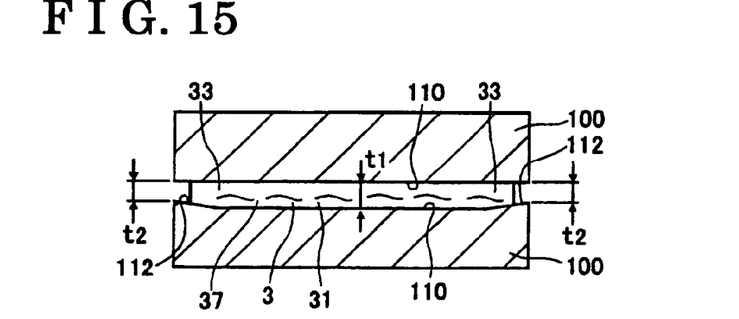
FIG. 15 shows a cross-sectional view illustrating a preliminary pressing condition of each of the gas diffusion electrodes before being bonded to the electrolyte membrane according to the seventh embodiment.

A seventh embodiment of the present invention will be explained with reference to FIGS. 14-16. The seventh embodiment basically has a similar structure, operation and effect to those of the first embodiment. Parts common to the first embodiment are numbered in the same manner, and in following part, emphasis will be placed on an explanation of differences from the first embodiment. In a preliminary pressing step, a preliminary pressing member 100 is used, functioning as a second pressing member. Next, each of the gas diffusion electrodes 3 (gas diffusion layer 37) forming a sheet-shape before being bonded to an electrolyte membrane 2 is preliminarily pressed in a thickness direction by a preliminary pressing surface 110 of the preliminary pressing member 100. At this time, on the preliminary pressing surface 110 of the preliminary pressing member 100, at least one part of an outer circumferential area 30 of each of the gas diffusion electrodes 3 (gas diffusion layer 37), such as a part facing a corner area 33, a projected surface 112 is formed, projected from the other area of the surface. For this reason, at a time of preliminary pressing, the corner area 33 of the outer circumferential area 30 can be pressed more strongly than a central area 31 of each of the gas diffusion electrodes 3. As a result, as shown in FIG. 15, a degree of thickness t2 of the corner area 33 of each of the gas diffusion electrodes 3 (gas diffusion layer 37) becomes less than that of the thickness t1 of the preliminary pressed central area 31 of each of the gas diffusion electrodes 3 (gas diffusion layer 37).

A catalyst layer may be either placed, or not placed, to each of the gas diffusion electrodes 3. If, as described above, preliminary pressing is applied on each of the gas diffusion electrodes 3, gas permeability and collectivity of electricity of each of the gas diffusion electrodes 3 can be flexibly adjusted according to the preliminary pressing force. Even when each of the gas diffusion electrodes 3 is made of a material like carbon fiber, a surface of the gas diffusion electrodes 3 can be protected from flix, an advantage which can lead to an improvement in the level of protection for the electrolyte membrane 2.

Figure 16:
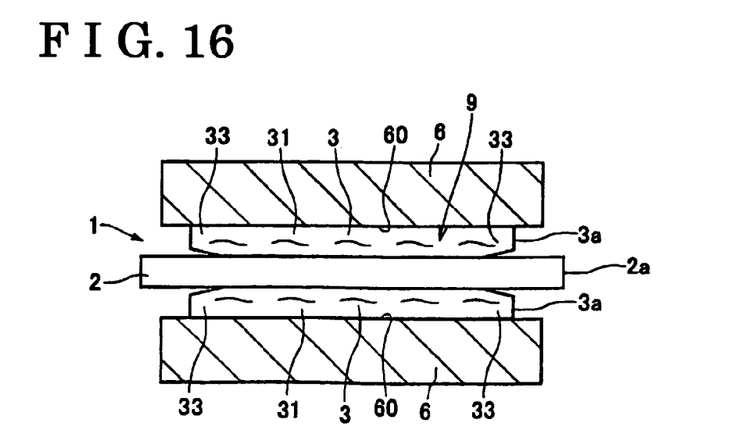
FIG. 16 shows a cross-sectional view illustrating a pressing condition of a stack made of a pair of the gas diffusion electrodes and the electrolyte membrane pressed by pressing plates according to the seventh embodiment.
Figure 17A:
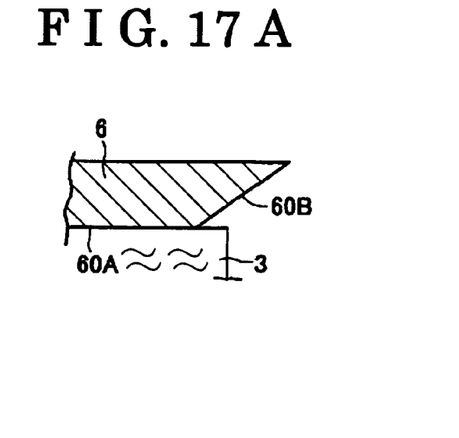
FIG. 17A-17E shows a partial cross-sectional view illustrating a substantial part of a pressing condition of a stack made of gas diffusion electrodes and an electrolyte membrane pressed by pressing plates according to the other embodiment.
Figure 17B:
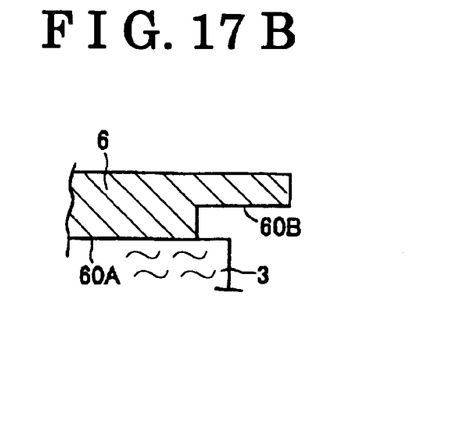
Figure 17C:
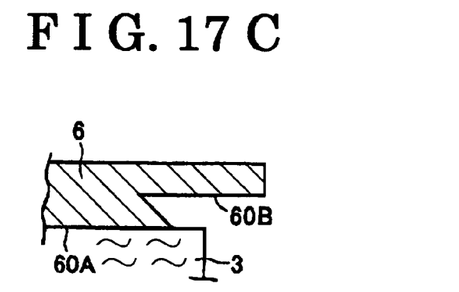
Figure 17D:
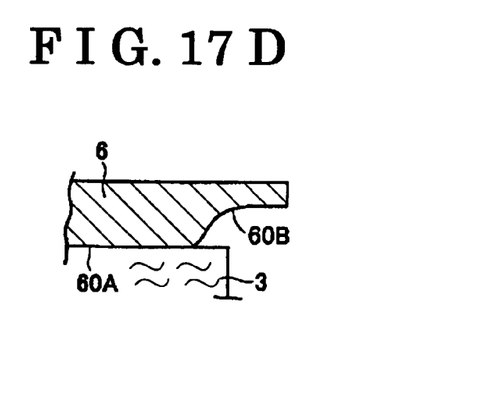
Figure 17E:
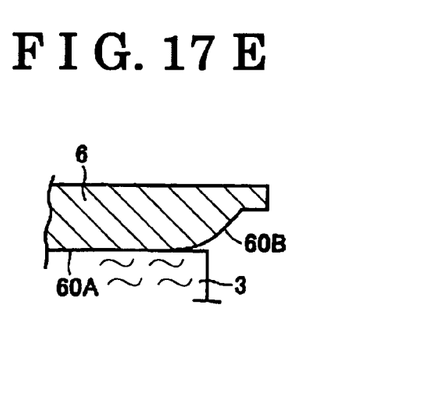

Also in the embodiment, in the pressing step, as shown in FIG. 16, a stack 9 of a pair of gas diffusion electrodes 3 and the electrolyte membrane 2 is pressed in a thickness direction. In the stack 9, each of the gas diffusion electrodes 3 includes a gas diffusion layer and a catalyst layer. In a stack making step, the catalyst layer can initially be placed either on the gas diffusion layer or the electrolyte membrane 2. Next, as shown in FIG. 16, the stack 9 is pressed by two pressing plates 6 in a thickness direction to make an MEA 1. When the pressing step described above is performed, a degree of bonding force for bonding the corner area 33 of each of the gas diffusion electrodes 3 to the electrolyte membrane 2 is set at a lower level than that of a bonding force for bonding the central area 31 of the gas diffusion electrodes 3 to the electrolyte membrane 2 (including a situation where no pressing is carried out). As a result, in the pressing process described above, or, even when the electrolyte membrane 2 is repeatedly expanded and contracted at a time that a fuel cell generates electricity, in the electrolyte membrane 2 a membrane part facing the corner area 33 of each of the gas diffusion electrodes 3 is protected from damage, a merit which is advantageous in terms of further improving the durability and longevity of the electrolyte membrane 2, and thus in terms of further improving the quality of the MEA 1.

Relevant embodiments of the present invention will be explained with reference to FIGS. 17A-17E. As illustrated in the Figures, a structure of each of the pressing plates 6 can be changed as and when appropriate. In these circumstances, in each of the gas diffusion electrodes 3 having gas diffusivity and electric conductivity, a level of a pressing force on a part facing the sub-surface 60B of the pressing plates 6 becomes inferior to that of the pressing force applied by the main pressing surface 60A of each of the main pressing plates 6A, or it becomes zero. Accordingly, in the pressing step, the outer circumferential area 30 (including a corner area 33) of each of the gas diffusion electrodes 3 can be inhibited from becoming excessively bonded to the electrolyte membrane 2, a merit which is advantageous for protecting from damage the part of the electrolyte membrane 2 facing the circumferential area 30 (including the corner area 33) of each of the gas diffusion electrodes 3.

Figure 18:
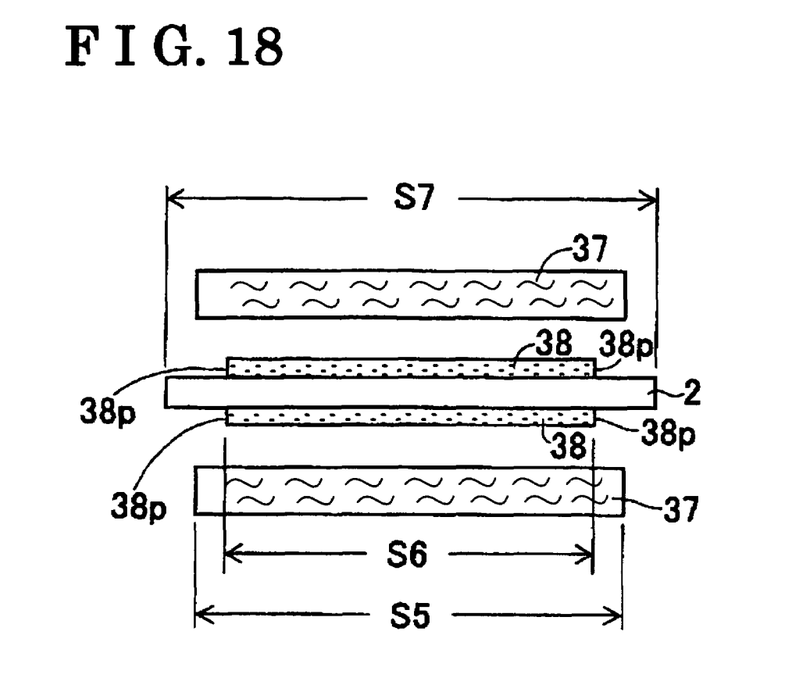
FIG. 18 shows a cross-sectional view illustrating a condition before an electrolyte membrane is bonded to each of the gas diffusion layers on which a catalyst layer is placed according to an eighth embodiment.

An eighth embodiment of the present invention will be explained with reference to FIG. 18 and FIG. 19. The eighth embodiment basically has a similar structure, operation and effect to those of the first embodiment. Parts common to the first embodiment are numbered in the same manner, and in the following part, the emphasis will be placed on an explanation of differences from the first embodiment. As shown in FIG. 18, in a preparing step, an electrolyte membrane 2 having ionic conductivity, and porous gas diffusion layers 37 having gas diffusivity and electric conductivity, are prepared. In a pressing step, a stack 9 made of a pair of gas diffusion layers 37, and an electrolyte membrane 2 positioned between the gas diffusion layers, and catalyst layers 38 positioned respectively between, on the one hand, each of the gas diffusion layers 37 and, on the other hand, the electrolyte membrane 2, is made.

In the condition described above, the stack 9 is pressed in a thickness direction by a pressing surface 60 of each of a pair of pressing plates 6 as a pressing member in a hot-press condition, thus to make an MEA 1. In the pressing step, a first step is performed for placing a catalyst layer 38 on a front and rear side of the electrolyte membrane 2, as is shown in FIG. 18, and after that, a second step is performed for placing each of the gas diffusion layers 37 on each of the catalyst layers 38 already placed on the electrolyte membrane 2, as is shown in FIG. 19. In this case, a projected area S5 of each of the gas diffusion layers 37 is set to be greater than the projected area S6 of the catalyst layer 38. In this case, the projected area S7 of the electrolyte membrane 2 is also set to be greater than the projected area S5 of each of the gas diffusion layers 37, and than the projected area S6 of the catalyst layer 38.

As described above, according to the embodiment, the projected area S5 of each of the gas diffusion layers 37 is set to be greater than the projected area S6 of the catalyst layer 38. For this reason, in the pressing step, by pressing the stack 9 in a thickness direction by means of the pressing plates 6 to make an MEA 1, in each of the gas diffusion layers 37 of the MEA 1, an outer circumferential area 39 provided outside an outer edge 38p of the catalyst layer 38 is not so strongly pressed. The reason why the outer circumferential area 39 is not so strongly pressed is the influence exerted by the thickness t10 of the catalyst layer 38. As a result, the level of pressing pressure on the outer circumferential area 39 of each of the gas diffusion layers 37 can be made inferior to that of the pressing pressure on a central area 31 of each of the gas diffusion layers 37, or it can be made zero.

Accordingly, also in the embodiment, a level of bonding force of the outer circumferential area 39 of each of the gas diffusion electrodes 3 having gas diffusivity and electric conductivity to the electrolyte membrane 2, is set to be inferior to that of the bonding force on the central area 31 of each of the gas diffusion electrodes 3. Thus, a membrane part of the electrolyte membrane 2 facing the outer circumferential area 39 of each of the gas diffusion electrodes 3 is protected from damage, a merit which is advantageous in terms of a further improvement in the durability, longevity and quality of the electrolyte membrane 2.

Figure 19:
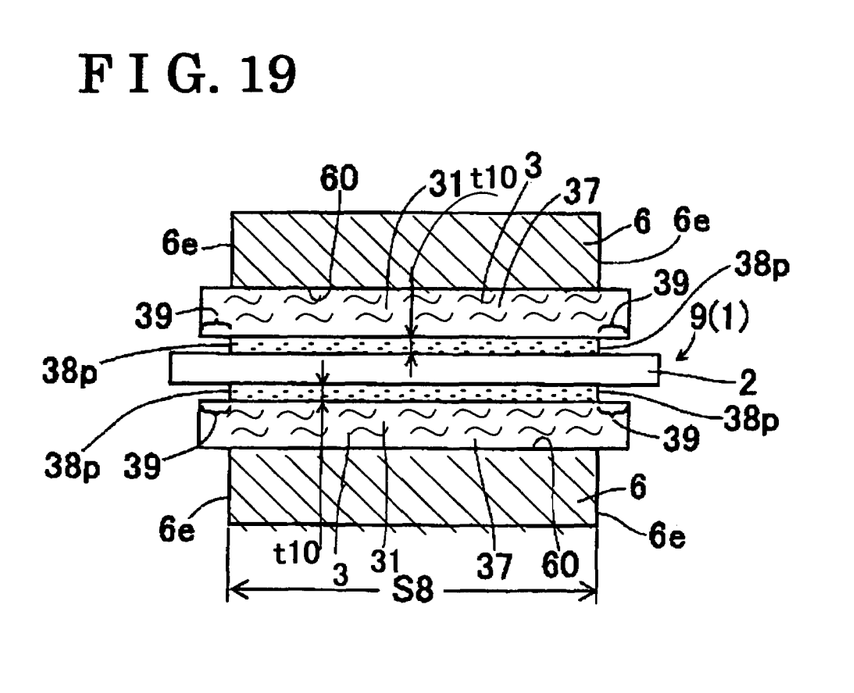
FIG. 19 shows a cross-sectional view illustrating a bonding condition of each of the gas diffusion layers to the electrolyte membrane on which a catalyst layer is placed by the pressing plates according to the eighth embodiment.

As shown in FIG. 18 and FIG. 19, a projected area S8 of each of the pressing plates 6 is set to be identical to the projected area S6 of the catalyst layer 38, or to be greater than the projected area S6 of the catalyst layer 38. Accordingly, when pressing is performed by the pressing plates 6, a pressing force of the pressing plates 6 can be applied to the entire part of the catalyst layer 38, an operation which can enhance a bonding property between the outer edge 38p of the catalyst layer 38 and the electrolyte membrane 2, and a bonding property between the outer edge 38p of the catalyst layer 38 and each of the gas diffusion layers 3. Thus, efficiency in the utilization of the catalyst layer 38 can be ensured.

Figure 20:
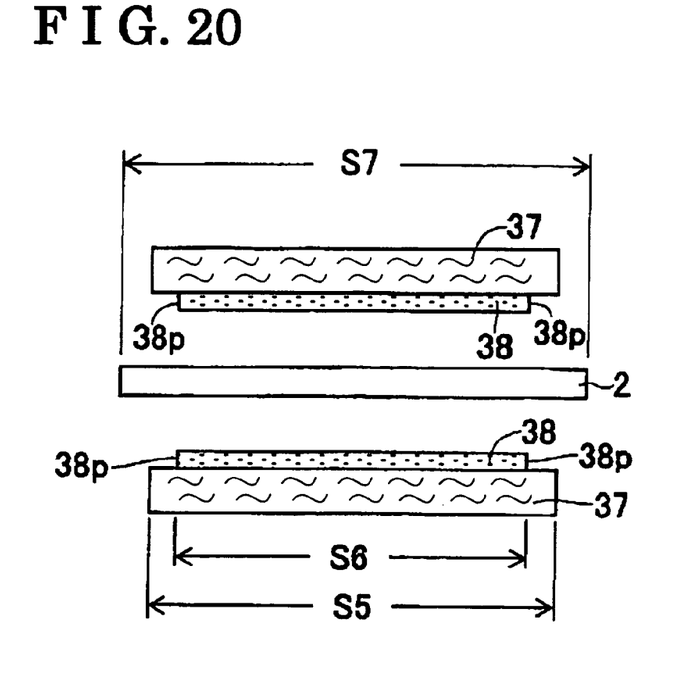
FIG. 20 shows a cross-sectional view illustrating a condition before an electrolyte membrane is bonded to each of gas diffusion layers on which a catalyst layer is placed according to a ninth embodiment.
Figure 21:
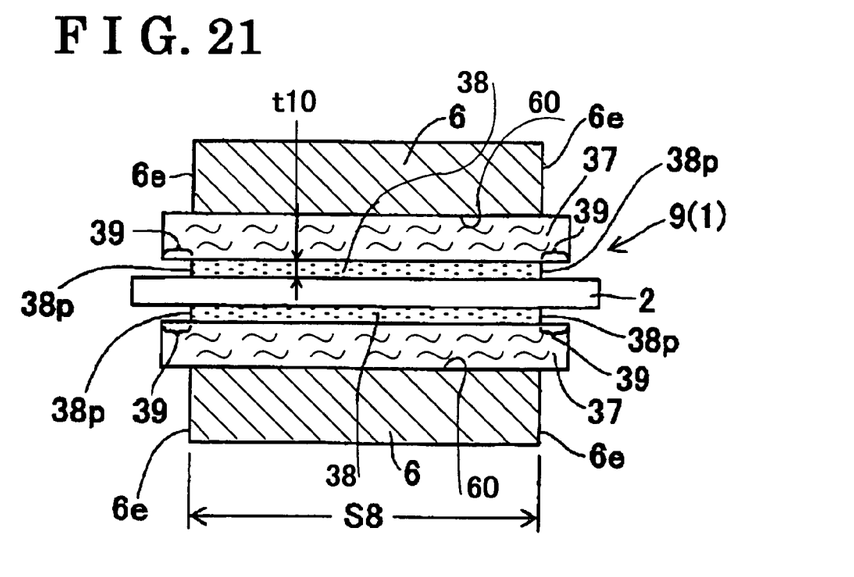
FIG. 21 shows a cross-sectional view illustrating a bonding condition of the electrolyte membrane to each of the gas diffusion layers on which a catalyst layer is placed by pressing plates according to the ninth embodiment.

A ninth embodiment of the present invention will be explained with reference to FIG. 20 and FIG. 21. The ninth embodiment basically has a similar structure, operation and effect to those of the first embodiment. Parts common to the first embodiment are numbered in the same manner and in the following part, emphasis will be placed on an explanation of difference from the first embodiment. As shown in FIG. 20, in a preparing step, an electrolyte membrane 2 having ionic conductivity, and porous gas diffusion layers 37 having gas diffusivity and electric conductivity, are prepared. In a pressing step, a stack 9 is made of a pair of gas diffusion layers 37 and the electrolyte membrane 2 positioned between the pair of gas diffusion layers 37, and catalyst layers 38 respectively positioned between, on the one hand, each of the gas diffusion layers 37 and, on the other hand, the electrolyte membrane 2. The pressing step includes a first step for placing the catalyst layers 38 respectively on each of the gas diffusion layers 37 having a projected area S5 greater than the projected area S6 of the catalyst layer 38, as is shown in FIG. 20, and a second step for placing the electrolyte membrane 2 on the catalyst layers 38, already placed on each of the gas diffusion layers 37, as is shown in FIG. 21.

In this case, the projected area S5 of each of the gas diffusion layers 37 is set to be greater than the projected area S6 of the catalyst layers 38. The projected area S7 of the electrolyte membrane 2 is set to be greater than the projected area S5 of each of the gas diffusion electrodes 37, and than the projected area S6 of the catalyst layers 38.

As described above, according to the embodiment, because the projected area S5 of each of the gas diffusion layers 37 is set to be greater than the projected area S6 of the catalyst layers 38, in the pressing step, when the stack 9 is pressed in a thickness direction by pressing plates 6 in a hot-press condition to make an MEA 1, in the same manner as in the embodiment 8, in each of the gas diffusion layers 37 of the MEA 1, an outer circumferential area 39 provided outside an outer edge 38p of the catalyst layer 38 is not so strongly pressed. The reason for this is the influence exerted by the thickness t10 of the catalyst layers 38. As a result, the level of pressing pressure on the outer circumferential area 39 of each of the gas diffusion layers 37 can be made inferior to the pressing pressure on a central area 31 of each of the gas diffusion layers 37, or it can be made zero.

Accordingly, also in the embodiment, a degree of bonding force of the outer circumferential area 39 of each of the gas diffusion electrodes 3 to the electrolyte membrane 2 is set to be inferior to that of the bonding force of the central area 31 of each of the gas diffusion electrodes 3 to the electrolyte membrane 2. Thus, in the electrolyte membrane 2, a membrane part facing the outer circumferential area 39 of each of the gas diffusion electrodes 3 is protected from damage, a merit which is advantageous in terms of a further improvement in durability, longevity and quality of the electrolyte membrane 2.

As is shown in FIG. 20 and FIG. 21, the projected area S8 of each of the pressing plates 6 is set to be identical to the projected area S6 of the catalyst layers 38, or to be greater than the projected area S6 of the catalyst layers 38. Therefore, when pressing is performed by means of the pressing plates 6, a pressing force of the pressing plates 6 can be applied on the entire part of the catalyst layers 38, an operation which enhances a bonding property between an outer edges 38p of the catalyst layers 38 and the electrolyte membrane 2, and a bonding property between the outer edges 38p of the catalyst layers 38 and each of the gas diffusion layers 37. Thus, efficiency in the utilization of the catalyst layer 38 can be ensured.

According to the embodiments above described, an electrolyte membrane 2 and each of the gas diffusion electrodes 3 are, but are not limited to, a substantially tetragonal shape in a plane view. In simple terms, it is acceptable if, in the electrolyte membrane 2, there is a danger of a part facing an outer circumferential area of each of the gas diffusion electrodes 3 becoming damaged. According to the above described embodiments, each of the gas diffusion electrodes 3 and the electrolyte membrane 2 is bonded by being pressed in a hot-press condition, but this pressing is not limited to a hot-press condition. Each of the gas diffusion electrodes 3 and the electrolyte membrane 2 can be pressed at a normal temperature. Moreover, the present invention will not be limited to the above described embodiments explained and shown in the drawing figures, and variations can be implemented without deviating from the content of the present invention.

According to an aspect of the present invention, a level of bonding force on at least one part of an outer circumferential area of each of the gas diffusion electrodes having gas diffusivity and electric conductivity to an electrolyte membrane is set to be inferior to that of the bonding force on a central area of each of the gas diffusion electrodes to the electrolyte membrane. Accordingly, in the electrolyte membrane, a membrane part facing the one part of each of the gas diffusion electrodes is protected from damage, a merit which is advantageous in terms of a further improvement in durability and longevity of the electrolyte membrane, and thus in further enhancing the quality of an MEA.

The present invention can be utilized for a fuel cell utilized in areas such as vehicles, stationing, electric equipment, and mobile goods.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A membrane electrode assembly for a fuel cell, comprising:
   an electrolyte membrane having ionic conductivity; and
   a pair of gas diffusion electrodes having gas diffusivity and electric conductivity, each of the pair of gas diffusion electrodes being bonded to one side or the other of the electrolyte membrane in a thickness direction, wherein
   a bonding force for bonding at least one part of an outer circumferential area of the gas diffusion electrodes to the electrolyte membrane is set to at an inferior level to that of the bonding force for bonding a central area of the gas diffusion electrodes to the electrolyte membrane, so that an area of the electrolyte membrane facing the at least one part of the outer circumferential area of the gas diffusion electrodes can be protected from damage.

2. The membrane electrode assembly for a fuel cell according to claim 1, wherein
   a base material used for forming the gas diffusion electrodes is a porous medium made of a material having electric conductivity.

3. The membrane electrode assembly for a fuel cell according to claim 1, wherein
   the each of the gas diffusion electrodes includes a gas diffusion layer having gas diffusivity and electric conductivity and a catalyst layer positioned between the gas diffusion layer and the electrolyte membrane.

4. The membrane electrode assembly for a fuel cell according to claim 1, wherein
   the at least one part of the outer circumferential area of the gas diffusion electrodes is provided at a circumferential area along an edge area of the outer circumferential area of the gas diffusion electrodes.

5. The membrane electrode assembly for a fuel cell according to claim 1, wherein
   the at least one part of the outer circumferential area of the each of the gas diffusion electrodes is provided at a corner area of the outer circumferential area of the each of the gas diffusion electrodes.

6. The membrane electrode assembly for a fuel cell according to claim 3, wherein
   a projected area of the gas diffusion layer is set to be greater than that of the catalyst layer, so that the bonding force for bonding at least one part of an outer circumferential area of the gas diffusion layer provided outside an outer edge of the catalyst layer to the electrolyte membrane is of an inferior level to that of the bonding force for bonding a central area of the gas diffusion layer to the electrolyte membrane.

7. A fuel cell, comprising the membrane electrode assembly according to claim 1.

* * * * *